Figures 1, 2:
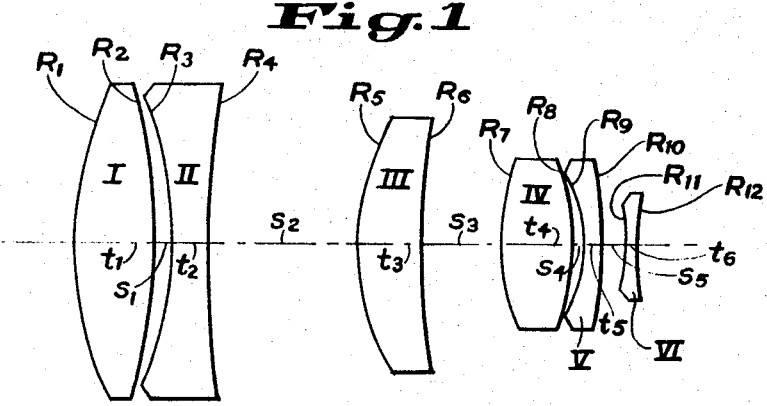

May 16, 1967   W. H. VAN GRAAFEILAND   3,320,016
SIX ELEMENT PETZVAL TYPE PROJECTION LENS
Filed March 26, 1963

| F = 100 mm. | | | | f/1.0 |
|---|---|---|---|---|
| LENS | $N_D$ | V | RADII | THICKNESSES |
| I | 1.517 | 64.5 | $R_1 = +111.4$ mm | $t_1 = 28.0$ mm. |
|   |       |      | $R_2 = -180.8$    | $S_1 = 4.9$ |
| II | 1.720 | 29.3 | $R_3 = -136.0$   | $t_2 = 13.3$ |
|    |       |      | $R_4 = +3240.$   | $S_2 = 48.1$ |
| III | 1.588 | 61.2 | $R_5 = +76.6$   | $t_3 = 22.4$ |
|     |       |      | $R_6 = +433.0$  | $S_3 = 24.9$ |
| IV | 1.620 | 60.3 | $R_7 = +64.6$    | $t_4 = 25.8$ |
|    |       |      | $R_8 = -69.1$    | $S_4 = 0.17$ |
| V | 1.720 | 29.3 | $R_9 = -66.5$     | $t_5 = 5.6$ |
|   |       |      | $R_{10} = -390.$  | $S_5 = 9.4$ |
| VI | 1.689 | 30.9 | $R_{11} = -73.0$ | $t_6 = 3.0$ |
|    |       |      | $R_{12} = +168.0$ | BF = 9.8 |

Wesley H. Van Graafeiland
INVENTOR.

BY R. Frank Smith
F. W. Emerson Holmes
ATTORNEYS

United States Patent Office 3,320,016
Patented May 16, 1967

3,320,016
SIX ELEMENT PETZVAL TYPE PROJECTION LENS
Wesley H. Van Graafeiland, Rochester, N.Y., assignor to Eastman Kodak Company, Rochester, N.Y., a corporation of New Jersey
Filed Mar. 26, 1963, Ser. No. 268,045
1 Claim. (Cl. 350—215)

This invention relates to projection lenses and particularly to highly corrected modifications of the well-known Petzval lens.

Petzval type lenses consist essentially of two widely spaced doublets either cemented or slightly airspaced. They cover only a relatively narrow angular field and are not particularly corrected for Petzval sum. However, they give good resolution at quite high aperture. Because of the curvature of field, it is now a fairly common practice to add a field flattener in the form of a negative element immediately in front of the focal plane. The simpler forms of Petzval lenses with or without a field flattener give acceptable quality at apertures as wide as $f/2.0$.

Various efforts have been made to extend Petzval type lenses to higher apertures. For example, the addition of a positive element between the rear doublet and the field flattener has provided good quality lenses of $f/1.4$ aperture.

The demands or requirements imposed on a camera or printer lens are generally not as high as those for a projection lens, as far as resolution and color correction are concerned. In fact, an early camera lens (U.S. Patent 1,967,836) operated at an aperture of $f/0.9$ and consisted of a Petzval lens in which an extra positive element was located between the doublets. Such lenses did not have the quality required for projection lenses. In recent years the resolution requirements have become even more critical since projection lenses are required to match the high resolution of modern color films. Recently, by incorporating both the added positive element between the doublets and the field flattener, and further by having an airspace in each of the doublets, it has been found possible to produce a lens with an aperture of $f/1.2$ with resolution satisfactory for projection purposes. For direct comparison, one can consider the two aberrations most difficult to control in this type of lens; namely, the "rim ray discrepancy" (the difference between the upper rim ray value and the lower rim ray value at some specified ray angle, say 5°) and the "astigmatism." A modern high quality projection lens must have not more than half the "rim ray discrepancy" and not more than 4 percent, i.e., 1/25, of the "astigmatism" of the early camera lens mentioned above. The recent $f/1.2$ projection lenses just mentioned do have this superiority over the early camera lens, even when the latter is stopped down to $f/1.2$.

The object of the present invention is to maintain this high resolution (low rim ray discrepancy and low astigmatism) with a projection lens operating at a full $f/1.0$.

The present invention is concerned primarily with the airspaces in the front and rear doublets. In the $f/1.2$ projection lenses just mentioned, the airspace in the front doublet is about .016F, where F is the focal length of the lens, and it is and was realized that if this airspace were opened up to .098F (the value in the early camera lens), all of the objectionable aberrations of that early camera lens would be present. Similarly, the airspace in the rear doublet of the $f/1.2$ projection lenses is about .0026F and if this airspace were eliminated as in the early camera lens, the aberrations would be unacceptable.

Nevertheless, according to the present invention, a range has been discovered between the values in the $f/1.2$ projection lens and the values in the early camera lens which is an improvement over both and which allows a projection lens of aperture $f/1.0$ to be made with the high correction or perhaps even higher correction than that of the $f/1.2$ projection lens. The values of these airspaces and the ratio of the front airspace to the rear airspace is very critical indeed. However, within the critical range, the improvement is astounding.

Thus the present invention constitutes a very important improvement of a lens of the modified Petzval type consisting of two airspaced doublets with a meniscus positive element between the doublets and a negative field flattener constituting a sixth element near the focal plane. The improvement according to the present invention is obtained simply by having the ratio of the airspace in the front doublet to the airspace in the rear doublet between 20 and 40. Preferably, the front airspace is between .035F and .070F and the rear airspace is between .0012F and .0022F. Values outside this range introduce aberrations which prevent the lens being used at an aperture of $f/1$. Since the lens is to work at an aperture of $f/1$, it is preferable to have the third element, i.e., the one between the two doublets, slightly more convex to the front than it is in an $f/1.2$ lens of similar quality. The front surface of this third element should have a radius of curvature between .5F and .8F and the rear surface preferably has a radius of curvature between 2.5F and 5.0F, whereas both of these surfaces are somewhat flatter in lenses made up to operate at a maximum aperture of $f/1.2$.

In the accompanying drawing:

FIG. 1 is a cross section of a preferred embodiment of the present invention.

FIG. 2 sets forth the optical specifications of such embodiment which constitutes Example 1 below.

*Example 1*

[$F=100$ mm. $f/1.0$]

| Lens | $N_D$ | V | Radii, mm. | Thickness, mm. |
|---|---|---|---|---|
| I | 1.517 | 64.5 | $R_1 = +111.4$ | $t_1 = 28.0$ |
|   |       |      | $R_2 = -180.8$ | $s_1 = 4.9$ |
| II | 1.720 | 29.3 | $R_3 = -136.0$ | $t_2 = 13.3$ |
|   |       |      | $R_4 = +3240.0$ | $s_2 = 48.1$ |
| III | 1.588 | 61.2 | $R_5 = +76.6$ | $t_3 = 22.4$ |
|   |       |      | $R_6 = +433.0$ | $s_3 = 24.9$ |
| IV | 1.620 | 60.3 | $R_7 = +64.6$ | $t_4 = 25.8$ |
|   |       |      | $R_8 = -69.1$ | $s_4 = 0.17$ |
| V | 1.720 | 29.3 | $R_9 = -66.5$ | $t_5 = 5.6$ |
|   |       |      | $R_{10} = -390.0$ | $s_5 = 9.4$ |
| VI | 1.689 | 30.9 | $R_{11} = -73.3$ | $t_6 = 3.0$ |
|   |       |      | $R_{12} = +168.0$ | $BF = 9.8$ |

*Example 2*

Example 2 is identical to Example 1 above except that $R_6$ is decreased to $+289$ mm., $R_{10}$ is decreased to $-231$ mm. and $R_{12}$ is increased to $+344$ mm. This increases the back focus of the lens to 11.6 mm. without any serious change in the aberration correction.

While the above Example 1 is the most preferred embodiment, it is obvious that somewhat different glasses may be used, so long as the positive elements have a relatively high V value and the negative elements with a high index of refraction have a relatively low V value. Of course, the choice of glass is more critical for some of the elements than for the others. The following is a table of the ranges over which the values of $N_D$, V, R, t and s may vary, in terms of the focal length F, within the invention.

| Element | $N_D$ | V |
|---|---|---|
| I | 1.50 to 1.53 | 62 to 67 |
| II | 1.68 to 1.76 | 27 to 31 |
| III | 1.50 to 1.60 | 55 to 67 |
| IV | 1.60 to 1.65 | 55 to 67 |
| V | 1.68 to 1.76 | 27 to 31 |
| VI | 1.60 to 1.80 | 27 to 35 |

$R_1 = +1.0F$ to $+1.3F$    $t_1 = .25F$ to $.30F$
$R_2 = -1.6F$ to $-2.0F$    $s_1 = .035F$ to $.070F$
$R_3 = -1.2F$ to $-1.6F$    $t_2 = .10F$ to $.15F$
$R_4 = +5.0F$ to $\infty$    $s_2 = .4F$ to $.6F$
$R_5 = +.5F$ to $+.8F$    $t_3 = .2F$ to $.3F$
$R_6 = +2.5F$ to $+5.0F$    $s_3 = .2F$ to $.3F$
$R_7 = +.6F$ to $+.8F$    $t_4 = .2F$ to $.3F$
$R_8 = -.6F$ to $-.8F$    $s_4 = .0012F$ to $.0022F$
$R_9 = -.6F$ to $-.8F$    $t_5 = .04F$ to $.07F$
$R_{10} = -2.0F$ to $\infty$    $s_5 = .08F$ to $.15F$
$R_{11} = -.5F$ to $-1.0F$    $t_6 = .01F$ to $.05F$
$R_{12} = +1.0F$ to $\infty$ Most of the above ranges, of course, do not separately distinguish over the prior art, since the present invention is directed to a simple but very important modification of a wellknown type of lens. The important characteristics of the present invention are the values of $s_1$ and $s_4$. These are defined more precisely than the other characteristics in the above table. The preferred embodiments of the present invention have the ratio $s_1/s_4$ between 20 and 40. Also, the ranges for the radii $R_5$ and $R_6$ are somewhat lower than the prior art, since this lens in the preferred embodiment is made more meniscus and therefore more convex to the front.

I claim:
An objective having substantially the following specifications where $N_D$ is the index of refraction and V the dispersion index of the elements numbered from the long conjugate side, which is herein referred to as the front, R is the radius of curvature of the surfaces, + and − indicate surfaces respectively convex and concave to the front, t and s are the axial thicknesses and spacings of the elements, all numbered from the front, and F is the focal length of the objective:

| Lens | $N_D$ | V | Radii, F | Thicknesses F |
|---|---|---|---|---|
| I | 1.52 | 65 | $R_1 = +1.1$<br>$R_2 = -1.8$ | $t_1 = .3$<br>$s_1 = .049$ |
| II | 1.72 | 29 | $R_3 = -1.4$<br>$R_4 = +32$ | $t_2 = .1$<br>$s_2 = .5$ |
| III | 1.59 | 61 | $R_5 = +.8$<br>$R_6 = +4.3$ | $t_3 = .2$<br>$s_3 = .2$ |
| IV | 1.62 | 60 | $R_7 = +.6$<br>$R_8 = -.7$ | $t_4 = .3$<br>$s_4 = .0017$ |
| V | 1.72 | 29 | $R_9 = -.7$<br>$R_{10} = -3.9$ | $t_5 = .06$<br>$s_5 = .09$ |
| VI | 1.69 | 31 | $R_{11} = -.7$<br>$R_{12} = +1.7$ | $t_6 = .03$ |

References Cited by the Examiner

UNITED STATES PATENTS 2,541,484   2/1951   Schade   88—57
2,989,895   6/1961   Sandback   88—57

JEWELL H. PEDERSEN, *Primary Examiner.*

R. J. STERN, *Assistant Examiner.*